United States Patent [19]

Szotek

[11] Patent Number: 5,266,212

[45] Date of Patent: Nov. 30, 1993

[54] PURIFICATION OF CYANIDE-FREE COPPER PLATING BATHS

[75] Inventor: Jeff Szotek, Ann Arbor, Mich.

[73] Assignee: Enthone-OMI, Inc., Warren, Mich.

[21] Appl. No.: 959,393

[22] Filed: Oct. 13, 1992

[51] Int. Cl.$^5$ .............................................. B01D 21/00
[52] U.S. Cl. ................................ 210/729; 204/DIG. 13
[58] Field of Search ................... 502/24; 210/702, 723, 210/729, 787, 800, 803; 204/14.1, 44.7, 44, 52.1, 106, DIG. 13

[56] References Cited

U.S. PATENT DOCUMENTS

| | | |
|---|---|---|
| 3,025,189 | 3/1962 | Arden . |
| 3,095,380 | 6/1963 | Arden . |
| 3,360,447 | 12/1967 | Svatek et al. . |
| 3,658,470 | 4/1972 | Zievers et al. . |
| 3,666,447 | 5/1972 | Saubestre . |
| 3,706,634 | 12/1972 | Kowalski . |
| 3,706,635 | 12/1972 | Kowalski . |
| 3,833,486 | 9/1974 | Nobel et al. . |
| 3,914,162 | 10/1975 | Kowalski . |
| 3,928,147 | 12/1975 | Kowalski . |
| 4,072,605 | 2/1978 | Thelander . |
| 4,107,011 | 8/1978 | Kucherenko et al. . |
| 4,144,149 | 3/1979 | Bollhalder et al. . |
| 4,162,217 | 7/1979 | Herrmann . |
| 4,352,786 | 10/1982 | Hoh et al. . |
| 4,462,874 | 7/1984 | Tomaszewski et al. . |
| 4,469,569 | 9/1984 | Tomaszewski et al. . |
| 4,600,699 | 7/1986 | Courduvelis ..................... 502/24 |
| 4,762,601 | 8/1988 | Krulik et al. . |
| 4,933,051 | 6/1990 | Kline . |
| 5,006,262 | 4/1991 | Weyls et al. . |

Primary Examiner—Frank Sever
Attorney, Agent, or Firm—Harness, Dickey & Pierce

[57] ABSTRACT

A process by which organo phosphonate and cupric ions may be removed from an electroplating bath containing contaminants. Excess acetate salt content causes precipitation of a copper/organo phosphonate (HEDP) precipitate which may be removed leaving the contaminants in solution.

20 Claims, No Drawings

PURIFICATION OF CYANIDE-FREE COPPER PLATING BATHS

BACKGROUND OF THE INVENTION

The present invention relates to cyanide-free copper plating baths. More particularly, the present invention relates to purification of cyanide-free copper plating baths whereby useful constituents of the copper bath may be precipitated and removed for reuse thereby leaving the contaminants for disposal.

The use of cyanide salts in copper plating electrolytes has become environmentally disfavored because of ecological considerations. Accordingly, a variety of non-cyanide electrolytes for various metals have heretofore been proposed for use as replacements for the well-known and conventional commercially employed cyanide counterparts. For example, U.S. Pat. No. 3,475,293 discloses the use of certain diphosphonate complexing agents for electroplating divalent metal ions; U.S. Pat. Nos. 3,706,634 and 3,706,635 disclose the use of combinations of ethylene diamine tetra (methylene phosphonic acid), 1-hydroxy, ethylidene-1,1-diphosphonic acid (HEDP), and amino tri(methylene phosphonic acid) as suitable ligands for the metal ions in which the bath further contains at least one strong oxidizing agent; while U.S. Pat. No. 3,928,147 discloses the use of an organophosphorus chelating agent for pretreatment of zinc die castings prior to electroplating with electrolytes of the types disclosed in U.S. Pat. Nos. 3,475,634 and 3,706,635.

While the electrolytes and processes disclosed in the aforementioned U.S. patents have provided satisfactory electrodeposits under carefully controlled conditions, such electrolytes and processes have not received widespread commercial acceptance as a direct result of one or more problems associated with their practice. One problem relates to the sensitivity of such electrolyte systems to the presence of contaminants such as cleaners, salts of nickel plating solutions, chromium plating solutions and zinc metal ions, all of which are frequently introduced into the electrolyte during conventional commercial practice. Such contaminants are introduced into the solution as iron from racks used to hold the parts during plating; as contaminants from inadequate rinsing of the parts prior to entry into the baths; or from etching of the parts themselves during immersion in such baths.

With the advent of new techniques such as shown in commonly assigned U.S. Pat. Nos. 4,462,874; 4,469,569; and 4,933,051, these cyanide-free plating processes have achieved a significant advance in commercial acceptance. However, even with these improvements in the cyanide-free plating art the copper baths eventually are subject to contaminants which will cause the baths to be unusable even though significant levels of copper (II) ions remain in solution along with significant quantities of rather expensive complexing agents. Thus, contaminants such as iron, tin, lead and others detrimentally affect the solutions and require premature disposal of useful portions of the solution unless the solution can be somehow purified or replenished.

Strong oxidizing agents such as U.S. Pat. No. 3,833,486 seem to extend the life of such contaminated solutions however, these also have practical limits. Thus, in order to increase the efficiency and commercial acceptance of these processes, it has been an unrealized goal in the art to remove the undesirable contaminants from such plating baths to extend the useful life of these baths.

Thus, U.S. Pat. Nos. 4,600,493; and 4,762,601 disclose use of a dialysis cell to separate contaminants from useful metal ions or cations. However, such a dialysis cell is extremely expensive to operate. Additionally, while the metal ion or cation component is a desirable component of the bath, it is also desirable to save the expensive complexing agents such as HEDP in such solutions. Use of dialysis cells does not result in the ability to separate these complexing agents. Other processes which attempt to separate useful components from copper plating baths include U.S. Pat. No. 5,006,262 which discloses a process for recovering copper from copper iron baths by reducing cupric ($Cu^{+2}$) ions to metallic copper ($Cu^0$) for recovery of copper from such baths prior to disposal of the baths. While copper is removed from the baths it is not readily useable in other plating baths in the reduced form and thus is not a commercially practical process for replenishing a plating bath. Additionally, there is no means for removal of the complexing agent which is an extremely expensive component of such plating baths. Other processes which relate to methods of purification of copper baths include U.S. Pat. Nos. 4,352,786; 4,162,217; 4,144,149; 4,107,011; 4,072,605; 3,666,447; 3,658,470; and 3,360,447. While many of these prior art patents disclose useful processes most are not readily reusable in electroplating baths and require further steps to utilize the copper or the like recovered from such baths. Additionally, these lack the advantage of removing complexing agents from such solutions in a readily reusable form.

Therefore, it has been a goal in the art to provide a suitable method for addressing the problem of unusable cyanide-free copper baths to allow the separation and use of useful components remaining in the bath from the unusable and detrimental contaminants in such a bath.

SUMMARY OF THE INVENTION

This goal has been met in the present invention in that the inventor has found that both cupric ions and organo phosphonate complexors can be selectively removed from solution by adding a source of a salt of a simple organic acid in excess amounts to such a solution. The utilization of this process results in the precipitation of a copper/organo phosphonate precipitate which is substantially free from other contaminants. The precipitate may be removed from the solution by filtration thereby leaving substantially all other soluble contaminants in the solution. Thus, the resulting contaminated solution can be treated and disposed of without loss of the expensive or desirable components. The copper/HEDP precipitate may thereafter be saved and re-added to plating baths or a bath can be recreated from such precipitates, adding suitable brighteners and the like, to provide a suitable new cyanide-free copper plating bath.

Additional benefits and advantages of the present invention will become apparent upon review of the description of the preferred embodiments set forth below in view of the accompanying examples and the claims appended hereto.

DESCRIPTION OF THE PREFERRED EMBODIMENTS

Thus, in accordance with the broad aspects of the present invention the present process is effective in a copper electroplating bath which includes an organo phosphonate (such as a HEDP complexing agent), cupric ions and various unwanted contaminants. The method includes precipitating a copper/HEDP precipitate from the bath by adding a source of a salt of a simple organic acid to the bath in excess quantities to provide precipitation of the copper/HEDP precipitate from the bath solution.

The process of the present invention is suitable for cyanide-free copper plating baths which contain cupric (copper II) ions and organo phosphonates with a preferred component being HEDP. Buffering or stabilizing agents, grain refining agents, wetting agents, surfactants, and other common additions to the baths may also be present and will not affect the usefulness of the subject invention. The critical elements to the present invention are the presence of cupric ions and the HEDP compositions.

Typically cupric ions are introduced in the bath as a bath soluble and compatible copper salt. Such additions are known in the electroplating art. Such cupric ions are present in an effective amount to electrodeposit copper on a substrate, and range in concentrations of from about 3 grams per liter to as high as about 50 grams per liter depending on the nature of the bath.

Organo phosphonate complexing agents are critical to such cyanide-free baths. As stated above, the preferred organo phosphonate for use with the present invention is a HEDP complexor, commonly utilized in todays electroplating baths. However, other complexors may be present, alone or in combination with the HEDP, which would not adversely affect the operation of the bath or the process of the present invention. Typically, in such baths HEDP is present in an amount of from about 50 to about 500 grams per liter. As stated above, the HEDP component is critical to such baths and is an extremely expensive component in relation to other components of the bath system. Thus, in the present invention the most expensive components, i.e. copper, ions and HEDP, are readily removed from the system for re-use leaving the contaminants in solution for disposal.

Typically, such baths also contain acetates as an essential component of the bath. The baths may also include brighteners, grain enhancers, surfactants or other bath additions known in the art. Typically, these bath additions exist in the bath at relatively low concentrations and therefore there is a corresponding low cost of these additions per bath, as compared to the HEDP and cupric ion constituents which account for the majority of the cost of such a bath. These additions typically remain in solution during the process of the present invention and therefore are discarded with the solution containing the contaminants. However, because the cost of these additions is low versus the recovered HEDP and cupric ions, the process of the present invention is cost effective particularly in view of the cost of replacing the whole bath. Furthermore, the cost of disposing these elements is very low as compared to the cost of disposing of a bath still containing its full concentration of copper cations.

The critical elements to be separated are of course the contaminants such as lead, tin, nickel, chrome and etc. which build up in the solution over repeated plating operations either due to improper cleaning of parts prior to plating or through some solvation of metals upon which the copper is being plated. Quantities of lead of 50 parts per million or above; chrome of 10 parts per million or above; and iron of 1 gram per liter or above provide undesirable conditions and degradation of the copper electroplating bath. Additionally, quantities of nickel, tin and zinc above approximately two hundred parts per million will likewise result in undesirable plating characteristics in such a bath.

As set forth above, the present inventor has discovered that a copper/HEDP precipitate is formed in such copper electroplating baths by the addition of a source of a salt of a simple organic acid to the bath such as potassium acetate or the combination of potassium hydroxide and acetic acid for forming the acetate salt. A typical bath for electroplating includes an acetate concentration of about 80 grams per liter, however, acetate concentrations in plating baths may vary from about 20 to about 120 grams per liter without affecting the characteristics of the bath. Excess quantities of a source of a salt of a simple organic acid such as acetates, which are primarily a buffering agent in the solution, will result in precipitation of a copper/HEDP complex which may be filtered and removed from the solution. Thus, simple organic acids which are useful as salts in the present invention have the formula:

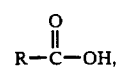

wherein R is selected from the group consisting of $CH_3$, $C_2H_5$, $C_3H_7$ and $C_4H_9$. To be effective such acids are used in their salt form which can be accomplished by utilizing the sodium or potassium salts of these acids or by separately adding the acid and sodium or potassium hydroxide to the solution to form the salts in solution. In a preferred embodiment an acetate is a preferred source of the simple organic acid salt. It has been found that typically additions of acetate sources such that greater than about 200 grams per liter acetate is provided in the solution will provide precipitation of a copper/HEDP complex from such baths. Generally preferred acetate concentrations for precipitating copper/HEDP precipitates from such baths range from about 250 grams per liter to about 600 grams per liter acetate additions. Typically, commercial baths will require from about 300 to about 500 grams per liter of acetate concentration in solution to provide the precipitate, preferably from about 350 to about 450 grams per liter acetate is required to provide the best precipitation of the copper/HEDP precipitate from solution. The acetate additions to such baths are employed such that the total acetate concentration is in the above levels, thus, the starting concentration of acetate is not critical provided the final acetate levels as set forth above are provided in the solution prior to precipitation. The acetate constituent can be provided by utilizing for instance potassium acetate, in a preferred embodiment. However, the acetate may also be provided by addition of potassium hydroxide and acetic acid to provide the necessary acetate concentration for precipitation of the precipitate.

If potassium acetate solid is added, heating of the solution may be desirable, i.e. a temperature of 140° F. has been found to be advantageous. However, if adding acetic acid and potassium hydroxide separately no heating of the solution is necessary or desirable since the temperature of the solution will be raised merely by these additions alone.

In a preferred embodiment the acetate may be added to the solution and the solution may be cooled to provide proper precipitation of the copper/HEDP precipitate. In a preferred embodiment suitable precipitate enhancing techniques such as salting of the solution may be required in order to begin precipitation of the copper/HEDP precipitate. One method of enhancing precipitation includes adding grains of Cupral ® bath salts (available from Enthone OMI, Inc., Warren, Mich.) to the solution in a cooled state.

The filtered precipitate of the present invention is a very amorphous type precipitate, which requires removal of any entrapped liquid prior to addition to a new solution or replenishing an existing bath.

Thus, in the present invention the entire bath may be treated. Alternatively, only a portion of the bath may be treated at a time. In this process the plating can be ongoing, by makeup of the portion treated, utilizing previously recovered precipitates or new components. The precipitate may be thereafter placed back into the bath at a later time to provide the critical components to the bath. Of course, suitable brighteners and other agents, such as grain refiners and the like, need to be added in proportional amounts to the addition of the precipitates of the present invention when recreating an operating bath. Thus, the level of contaminants could be reduced and controlled in the bath without discarding expensive cupric ion and HEDP, thereby lengthening the life of the bath.

In order to further illustrate the process of the present invention, the following specific examples are provided. It will be understood that the examples as hereinafter set forth are provided for illustrative purposes and are not intended to be limiting to the scope of this invention as herein disclosed and is set forth in the subjoined claims.

EXAMPLE I

A commercial Cupral ® bath was prepared in accordance with the parameters as set forth in Table I below.

TABLE I

| | |
|---|---|
| Copper (as acetate) | 9.5 g/l |
| 1-Hydroxyethylidene-1,1-diphosphonic acid | 101 g/l |
| Carbonate (as potassium salt) | 18 g/l |
| 2-thiouracil | 1.2 ppm |
| Sodium 2-ethylhexyl sulfate | 130 ppm |
| pH (adjusted with potassium hydroxide) | 9.5–10.0 |

The bath above was run commercially until the solution became commercially impractical for any further plating.

A 400 ml sample of this solution in its depleted form was obtained. The solution was analyzed to determine the starting composition as set forth in Table II below.

TABLE II

| | |
|---|---|
| Complexor (HEDP) | 67.4 g/l |
| Iron | 2.5 g/l |
| Copper | 6.7 g/l |
| Nickel | 207 ppm |
| Chrome | 2.6 ppm |
| Tin | 290 ppm |
| Lead | 4.8 ppm |
| Acetate | 80.0 g/l |

100 ml of acetic acid was added slowly with good agitation. 115 grams of solid potassium hydroxide was added to adjust the pH of the solution to 10. The total of volume of the solution after the additions was 520 ml. This solution was then allowed to stand overnight uncovered. The next morning no solids were noted. Two equal 260 ml volumes of the solution were split up and were designated solution A and solution B. Solution A was heated on a hot plate with stirring to concentrate the solution. At an approximate volume of 200 ml the solids precipitated out. The solution was filtered using a conventional anode bag as a filter to collect the precipitate.

To 10 ml of solution B approximately 1 g dried Cupral ® solids were added to salt the solution and promote precipitation. The solution began precipitating with the addition of the solids in 15 to 20 minutes. The 10 ml aliquot with formed precipitates was then added to the remainder of solution B. Over a period of three hours the entire solution appeared to gel forming the amorphous type powder blue precipitate. The solids were removed by suction filtration. 230 ml of filtrate was collected. The solids from solution B were then redissolved in water and diluted to the original 200 ml volume. The liquids taken from solution B were condensed from 230 ml to 200 ml to provide the original volume of solution. An analysis was performed utilizing inductively coupled plasma apparatus for the metal concentrations, and high pressure liquid chromatography for the acetate and complexor concentrations. The resulting filtrate solution and solids were analyzed for the same constituents as the original bath and the results are set forth in Table III.

TABLE III

| | Solution B Liquid (200 ml) | Solution B Solid (200 ml) |
|---|---|---|
| Complexor | 14.0 g/l | 43.4 g/l |
| Iron | 2.1 g/l | 0.3 g/l |
| Copper | 0.05 g/l | 6.2 g/l |
| Nickel | 166 ppm | 23 ppm |
| Chrome | 2.2 ppm | 0.8 ppm |
| Tin | 254 ppm | 37 ppm |
| Lead | 2.9 ppm | 0 ppm |
| Acetate | 278.4 g/l | 41.2 g/l |

As can be readily appreciated from the example, large amounts of the complexor and a major amount of the copper ions were removed from the original solution with very minor amounts of contaminants, whereas the filtrate solution includes a majority of the contaminants with minor amounts of complexor and copper. Thus, the above example demonstrates that the desirable copper/HEDP precipitate may be removed from the solution substantially leaving the undesirable contaminants in the solution.

EXAMPLE II

A copper plating bath is prepared in accordance with the parameters set forth in Table I. The plating bath is used commercially until the bath is degraded beyond acceptable levels for commercial use. To the bath is added an excess of acetate in the form of acetic acid and potassium hydroxide until the acetate concentration is about 250 g/l, the solution is allowed to cool and a copper/organo phosphonate precipitate is formed. The precipitate is found to be substantially free of contaminants. This experiment is repeated using concentrations of acetate at 200 g/l, 300 g/l, 350 g/l, 400 g/l, 450 g/l, 500 g/l, 550 g/l and 600 g/l. A light precipitate is found at 200 g/l with steadily increasing quantities of precipitate up to about 300 g/l wherein the quantity of precipitate remains constant.

EXAMPLE III

A copper plating bath was prepared in accordance with the parameters set forth in Table I. The plating bath was used commercially until the bath was degraded beyond acceptable levels for commercial use. A potassium salt of propionic acid was added for providing a 300 g/l concentration of this salt in solution. A copper/HEDP precipitate was formed in the bath.

EXAMPLE IV

A copper plating bath is prepared in accordance with the parameters set forth in Table I. The plating bath is used commercially until the bath is degraded beyond acceptable levels for commercial use.

Sodium and potassium salts of propionic, butyric and pentonoic acids are added to samples of the bath to provide concentrations of 200 g/l, 300 g/l, 350 g/l, 400 g/l, 450 g/l, 500 g/l, 550 g/l and 600 g/l. Copper/HEDP precipitates are formed in the solution at each of these levels for each of the organic acid salts.

EXAMPLE V

The precipitate of Example I is utilized to form an electroplating bath in accordance with the parameters of Table I with the precipitate being used to supply copper (II), HEDP and acetate. The bath is found to be fully operational for normal copper plating.

EXAMPLE VI

The precipitates of Example II are utilized to formulate baths or as additions to existing baths. The baths made with these precipitates are found to be effective for copper plating. The additions made to existing baths do not detrimentally effect plating.

It is to be understood that the above description and examples of the preferred embodiments are not to be limiting to the present invention. The present invention can be practiced otherwise than as specifically disclosed above as it will be readily appreciated by those skilled in the art. Thus, it is appreciated that the invention is susceptible to modification, variation and change without departing from the proper scope or fair meaning of the accompanying claims.

What is claimed is:

1. A method comprising: separating copper ions and organo phosphonates from a cyanide free copper electroplating plating bath containing an organo phosphonate complexing agent, copper ions and contaminants by,
    a) adding a source of a salt of a simple organic acid to the bath in effective quantities for causing precipitation of a copper/organo phosphonate precipitate from the bath; and
    b) separating the copper/organo phosphonate precipitate from the solution thereby leaving the contaminants in solution.

2. The method of claim 1 wherein said organo phosphonate complexing agent is HEDP, and said copper/organo phosphonate precipitate is a copper/HEDP precipitate.

3. The method of claim 2 wherein the source of a salt of a simple organic acid is a salt of a simple organic acid having the formula:

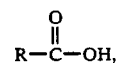

wherein R is selected from the group consisting of $CH_3$, $C_2H_5$, $C_3H_7$, and $C_4H_9$.

4. The method of claim 3 wherein the source of a simple organic acid is an acetate containing composition which is added in quantities to raise the concentration of acetate source in the bath to a level of greater than about 200 g/l in the bath for causing precipitation of the copper/organo phosphate precipitate from the bath.

5. The method of claim 4 wherein said acetate containing composition is selected from the group consisting of potassium acetate, a combination of potassium hydroxide and acetic acid and mixtures thereof.

6. The method of claim 5 wherein the concentration of acetate source in the bath for precipitating the copper/organo phosphonate precipitate is from about 200 g/l to about 600 g/l.

7. The method of claim 5 wherein the concentration of acetate source is raised to from about 300 g/l to about 500 g/l of acetate source.

8. The method of claim 5 wherein the concentration of acetate source in solution is raised to from about 350 g/l to about 450 g/l of acetate source.

9. A process comprising: purifying a cyanide free copper electroplating bath containing organo phosphonate, copper ions and undesirable contaminants by,
    a) adding a source of a salt of a simple organic acid in effective amounts to the bath to cause precipitation of a copper/organo phosphonate precipitate in the bath sufficient to enable the contaminants contained in the bath remain in solution;
    b) separating the precipitate of step a) from the solution components of the bath; and
    c) utilizing the precipitate in a copper electroplating bath for providing an organo phosphonate and copper to the bath.

10. The process of claim 9 wherein the organo phosphonate is HEDP, and said copper/organo phosphonate precipitate is a copper/HEDP precipitate.

11. The process of claim 9 wherein the source of a salt of a simple organic acid is a salt of a simple organic acid having the formula:

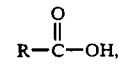

wherein R is selected from the group consisting of $CH_3$, $C_2H_5$, $C_3H_7$, and $C_4H_9$.

12. The process of claim 11 wherein the source of a salt of a simple organic is an acetate containing composition.

13. The process of claim 12 wherein the acetate containing composition is selected from the group consisting of potassium acetate, a mixture of potassium hydroxide and acetic acid and mixtures thereof.

14. The process of claim 9 wherein said precipitate is utilized as an addition to an existing bath.

15. The process of claim 9 wherein said precipitate is utilized as start up constituents for a copper electroplating bath.

16. The process of claim 9 wherein only a portion of the bath is removed and treated during commercial operation of the bath whereby the bath life may be lengthened by removal of contaminants and replacement of the copper/organo phosphonate precipitate.

17. The process of claim 9 wherein the acetate containing composition is added in amounts to bring the acetate source concentration in the bath to from about 200 g/l to about 600 g/l.

18. The process of claim 9 wherein the acetate containing composition is added in amounts to bring the acetate source concentration in the bath to from about 300 g/l to about 500 g/l.

19. The process of claim 9 wherein the acetate containing composition is added to the bath in an amount to bring the acetate source concentration in the bath to a level of from about 350 g/l to about 450 g/l.

20. A process for purifying a copper electroplating bath containing HEDP, copper ions and undesirable contaminants comprising the steps of:
 a) providing a copper electroplating bath containing HEDP, copper ions and undesirable contaminants;
 b) adding potassium acetate in amounts to bring the potassium acetate concentration in the bath to about 350 g/l;
 c) lowering the temperature of the bath thereby causing precipitation of a copper/HEDP precipitate in the bath whereby the contaminants contained in the bath remain in solution;
 d) separating the precipitate of step c) from the solution components of the bath;
 e) dissolving the precipitate of step d) in water; and
 f) adding suitable brighteners, grain enhancers, surfactants and the like to the solution of step e) to create a suitable copper plating bath.

* * * * *

UNITED STATES PATENT AND TRADEMARK OFFICE
CERTIFICATE OF CORRECTION

PATENT NO. : 5,266,212
DATED : November 30, 1993
INVENTOR(S) : J. Szotek

It is certified that error appears in the above-indentified patent and that said Letters Patent is hereby corrected as shown below:

Column 8, Line 13 "phosphate" should be --phosphonate--

Signed and Sealed this

Twenty-first Day of February, 1995

Attest:

BRUCE LEHMAN

Attesting Officer

Commissioner of Patents and Trademarks